United States Patent Office 3,413,339
Patented Nov. 26, 1968

3,413,339
AMINE COMPOUNDS AND METHODS FOR
THEIR PRODUCTION
Robert A. Scherrer, Ann Arbor, Mich., assignor to Parke,
Davis & Company, Detroit, Mich., a corporation of
Michigan
No Drawing. Filed June 18, 1964, Ser. No. 376,265
6 Claims. (Cl. 260—518)

ABSTRACT OF THE DISCLOSURE

N-arylanthranilic acids and salts and esters thereof in which the N-aryl group is phenyl, substituted in the 2-position by methyl, chlorine, or primary amino, optionally substituted in the 6-position by methyl, chlorine, or primary amino, and substituted in the 3-position by chlorine, primary amino, or a tertiary amino group, such as dimethylamino, diethylamino, or pyrrolidino, provided that one and only one of the said substituents is an amino group. The compounds are useful as anti-inflammatory, anti-pyretic, and anti-allergic agents and are produced by (a) reduction of an appropriately substituted N-(nitrophenyl)anthranilic acid compound to produce one of the N-(primary aminophenyl)anthranilic acid compounds; (b) reaction of an N-(primary aminophenyl)anthranilic acid compound, substituted with bromine or iodine in addition to the substituents named above, with hydrogen to remove the halogen substituent and produce one of the N-(primary aminophenyl)anthranilic acid compounds; (c) condensation of an o-halo- or o-aminobenzoic acid derivative with an appropriately substituted aniline or halo-benzene compound; (d) alkylation of an appropriately substituted N-(3-primary aminophenyl)anthranilic acid compound to produce one of the N-(3-tertiary aminophenyl)anthranilic acid compounds; (e) hydrolysis of an appropriately substituted N-acylated diphenylamine compound at the position ortho to the N-acyl group by a carboxy group or a group hydrolyzable to a carboxy group; and (f) esterification of the free acids to produce a lower alkyl or di-lower alkyl-aminoalkyl ester.

Summary and detailed description

The present invention relates to new N-arylanthranilic acid compounds and to methods for their production. More particularly, the invention relates to new N-(aminophenyl)anthranilic acid compounds, which in their free acid form have the formula

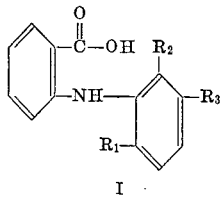

I to carboxylate salts thereof, to lower alkyl esters thereof, to di-lower alkyl-aminoalkyl esters thereof, and to pharmaceutically-acceptable acid-addition salts and quaternary ammonium salts of the di-lower alkyl-aminoalkyl esters thereof; where $R_1$ is hydrogen, methyl, chlorine, or primary amino; $R_2$ is methyl, chlorine, or primary amino; and $R_3$ is chlorine or an amino group having the formula

where $R_4$ and $R_5$ are the same and are each hydrogen, methyl, or ethyl, or are combined with the nitrogen atom to which they are attached to represent a heterocyclic ring, such as pyrrolidino; one of said $R_1$, $R_2$, and $R_3$ being an amino group. N-(aminophenyl)anthranilic acid compounds containing more than one amino group as defined above by $R_1$, $R_2$, and $R_3$ are not within the scope of the invention. In general, the preferred compounds of the invention are the free acids of Formula I. In the lower alkyl esters of the invention, the lower alkyl radicals are alkyl radicals having no more than 7 carbon atoms, and are preferably methyl or ethyl. In the di-lower alkyl-aminoalkyl esters of the invention, the lower alkyl radicals are alkyl radicals having no more than 4 carbon atoms, and are preferably methyl or ethyl. Examples of preferred di-lower alkyl-aminoalkyl esters are the 2-dimethylaminoethyl and 3-diethylaminopropyl esters.

In accordance with the invention, N-(aminophenyl)-anthranilic acid compounds of the formula

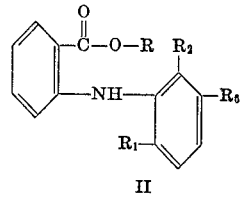

II are produced by the reduction of an N-(nitrophenyl) anthranilic acid compound of the formula

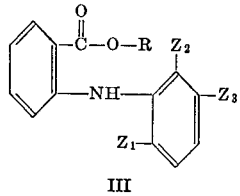

III where R is hydrogen, lower alkyl, di-lower alkyl-aminoalkyl, or a salt-forming cation; $R_1$ and $R_2$ are as defined previously, and $R_6$ is chlorine or primary amino, one of said $R_1$, $R_2$, and $R_6$ being primary amino; $Z_1$ is hydrogen, methyl, chlorine, or nitro; $Z_2$ is methyl, chlorine, or nitro; and $Z_3$ is chlorine or nitro; one of said $Z_1$, $Z_2$, and $Z_3$ being nitro. The reduction may be accomplished by employing chemical, catalytic, or electrolytic means. Chemical reducing agents that may be used include iron and acetic acid, iron and hydrochloric acid, zinc in ethanol, aluminum amalgam in ethanol, tin in hydrochloric acid, a stannous halide in a hydrohalic acid, ammonium sulfide, and sodium sulfide. The reduction is accomplished catalytically by employing gaseous hydrogen and Raney nickel or a noble metal catalyst, such as platinum, platinum oxide, palladium, or palladium oxide, which may optionally be supported on an inert carrier, such as charcoal. Catalytic reduction employing a noble metal catalyst and hydrogen at room temperature and one atmosphere pressure in an inert solvent is the preferred method; more vigorous conditions should not be employed when any of $Z_1$, $Z_2$, or $Z_3$ in Formula III is chlorine in order to avoid reductive removal of the halogen atom. Suitable solvents that may be used include water, for reduction of the compounds of Formula III where R is a salt-forming cation; lower alkanols, preferably ethanol; ethers, such as tetrahydrofuran and dioxane; N,N-dimethylformamide; and mixtures of these. When chemical reduction means are employed, it is preferable to use a slight excess of reducing agent, although approximately equivalent amounts of reactants may also be used. When the reduction is accomplished catalytically, the reaction is allowed to proceed until the required amount (3 molecular equivalents) of hydrogen has been taken up.

When the foregoing reduction is carried out using an ester as starting material, that is, a compound of Formula III where R is lower alkyl or di-lower alkyl-aminoalkyl, the product obtained is the corresponding ester of Formula II. The free acid may then be obtained by hydrolysis of the ester and acidification. When a carboxylate salt is used as starting material, the product obtained is the corresponding salt, which may be converted to the free acid by acidification of the reaction product mixture.

The N-(nitrophenyl)anthranilic acid compounds of Formula III used as starting materials in the foregoing process can be prepared in a number of ways. The free acids can be prepared by reacting potassium o-bromobenzoate with a compound of the formula

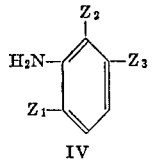

IV at a temperature of 75–200° C. in an unreactive solvent in the presence of a copper-containing catalyst and a proton acceptor followed by acidification of the reaction product; where $Z_1$, $Z_2$, and $Z_3$ are as defined before. The salts and esters of Formula III are obtained from the free acids by conventional salt-forming and esterification methods. The compounds of Formula IV required for the preparation of these starting materials are obtained by nitration of appropriately substituted aniline compounds or acetanilide compounds followed by acid hydrolysis to remove the N-acetyl group.

Also in accordance with the invention, N-(aminophenyl)anthranilic acid compounds of the formula

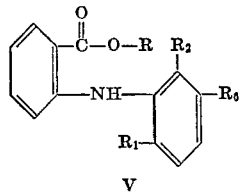

V are produced by the reaction of an N-(aminophenyl) anthranilic acid compound of the formula

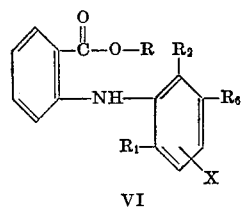

VI with gaseous hydrogen in an inert solvent in the presence of a hydrogenation catalyst; where R, $R_1$, $R_2$, and $R_6$ are as defined previously and X is bromine or iodine. Hydrogenation catalysts that may be used in this reaction are the noble metal catalysts, such as platinum oxide, palladium oxide, platinum and palladium, used as finely divided powders either in the free state or supported on an inert carrier, such as charcoal. The preferred catalyst is palladium on charcoal. The reaction is facilitated by the addition to the reaction mixture of an alkali metal acetate, such as sodium acetate, in a quantity equivalent to the amount of N-(aminophenyl)anthranilic acid compound of Formula VI employed. Suitable solvents for the reaction are lower alkanols, N,N-dimethylformamide, tetrahydrofuran, water, and mixtures of these. A prefererd solvent is a mixture of ethanol and water. Preferred conditions for the reaction are room temperature and a hydrogen pressure of one atmosphere; more vigorous conditions should not be employed when any of $R_1$, $R_2$, or $R_6$ is chlorine in order to avoid reductive removal of this halogen. The reaction is allowed to proceed until the required amount (one molecular equivalent) of hydrogen is taken up.

The N-(aminophenyl)anthranilic acid compounds of Formula VI employed as starting materials can be produced in situ by reduction of N-(nitrophenyl)anthranilic acid compounds of the formula

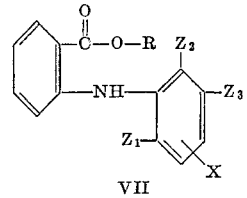

VII where R, $Z_1$, $Z_2$, $Z_3$ and X have the aforementioned significance. They are then reacted further without isolation. The N-(nitrophenyl)anthranilic acid compounds of Formula VII are prepared according to a procedure analogous to that described above for the preparation of the N-(nitrophenyl)anthranilic acid compounds of Formula III by employing compounds of Formula IV that are suitably substituted with bromine or iodine.

Further in accordance with the invention, N-(aminophenyl)anthranilic acid compounds of the formula

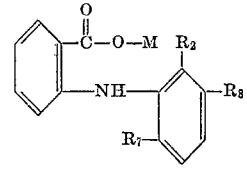

VIII are produced by condensing a benzoic acid derivative of the formula

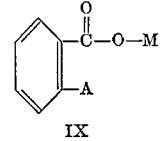

IX with a compound of the formula

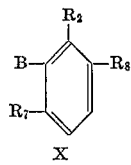

X where $R_2$ has the aforementioned signficance; $R_7$ is hydrogen, methyl, or chlorine; $R_8$ is chlorine, di(lower alkyl)amino, or a heterocyclic amino group, such as pyrrolidino; provided that, when $R_2$ is primary amino, $R_8$ is chlorine and $R_7$ is methyl or chlorine, and further provided that, when $R_8$ is di(lower alkyl)amino or a heterocyclic amino group, $R_2$ is methyl or chlorine, and $R_7$ is hydrogen, methyl, or chlorine; M represents hydrogen, lower alkyl, or an alkali metal cation, preferably potassium; and one of A and B is halogen, preferably bromine, and the other is amino. Best results are obtained when A is halogen and B is amino. The reaction is preferably carried out in the presence of a copper-containing catalyst and a proton acceptor. In carrying out this condensation it is generally satisfactory to employ substantially equivalent quantities of the reactants in the presence of a suitable solvent. Some examples of such solvents are N,N-dimethylformamide, diethylene glycol dimethyl ether, dimethyl sulfoxide, nitrobenzene, and lower aliphatic alcohols such as isopropyl alcohol, n-butanol, amyl alcohol, isoamyl alcohol and the like. Preferred solvents are isopropyl alcohol, N,N-dimethylformamide and diethylene glycol dimethyl ether. In general, the reaction is favored by temperatures in excess of 75° C. and is preferably carried out at a temperature between 80° and 200° C.

Some examples of the copper-containing catalysts which can be used in carrying out the process are various forms of mechanically divided or chemically precipitated metallic copper such as e.g. powdered copper or spongy copper and various copper-containing compounds such as cuprous bromide, cuprous chloride, cupric acetate, cupric bromide, cupric carbonate, cupric oxide, cupric sulfate and the like. Cupric bromide and cupric acetate are preferred catalysts.

The quantity of the proton acceptor employed in the reaction can be varied within wide limits. In general, sufficient should be used to bind the benzoic acid reactant and the hydrohalic acid formed in the course of the reaction. Some of the proton acceptors which can be used when the benzoic acid derivative is employed in free acid form are alkali metal carbonates, preferably potassium carbonate; cupric carbonate; cuprous carbonate and the like. When an alkali metal salt, preferably the potassium salt, of the benzoic acid reactant is employed, the following substances can be used as the proton acceptor: calcium hydride, alkali metal carbonates, such as potassium carbonate, and tertiary organic amines, such as N-ethylmorpholine. If desired, two or more equivalents of the amine reactant can be used, in which case one equivalent takes part in the condensation and the remainder acts as the proton acceptor.

The benzoic acid reactant is advantageously added to the reaction mixture in the form of its preformed alkali metal salt, preferably the potassium salt. Alternatively, the potassium salt of the benzoic acid reactant can be conveniently prepared in situ in a very finely divided condition by adding potassium carbonate to a boiling solution of the free acid form of the corresponding benzoic acid derivative in the solvent employed in the reaction. In the latter case, it is often advantageous to remove most of the water formed in the neutralization by distilling some of the solvent prior to the addition of the catalyst and other reactant.

The compounds of Formula X, where B is amino, $R_2$ is methyl or chlorine, $R_7$ is hydrogen, methyl, or chlorine and $R_8$ is di(lower alkyl)amino or a heterocyclic amino group, required as starting materials in the foregoing procedure can be prepared as follows. A 3-nitroaniline compound of the formula

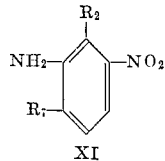

XI is acetylated by reaction with acetic anhydride, and the resulting 3-nitroacetanilide compound is reduced to obtain a 3-aminoacetanilide compound of the formula

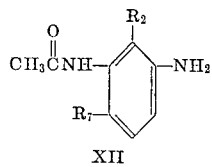

XII

The 3-aminoacetanilide compound of Formula XII is alkylated, either by reaction with formaldehyde under catalytic hydrogenation conditions or by reaction with an alkyl halide to obtain an acetanilide compound of the formula

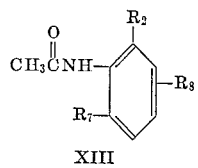

XIII and the acetanilide compound is hydrolyzed in an acidic medium to remove the N-acetyl group and give the desired starting material of Formula X. In Formulas XII and XIII, $R_2$, $R_7$, and $R_8$ have the same significance as given above.

The compounds of Formula X, where B is bromine and $R_2$ is methyl or chlorine, which may also be used as starting materials in the foregoing process, can be prepared by the diazotization, in hydrobromic acid, of the compounds of Formula X, where B is amino and $R_2$ is methyl or chlorine, followed by decomposition of the diazonium salt obtained in the presence of a copper catalyst.

In accordance with another process of the invention, N-(aminophenyl)anthranilic acid compounds having the formula

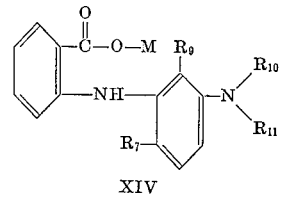

XIV are produced by alkylation of an N-(3-aminophenyl)-anthranilic acid compound of the formula

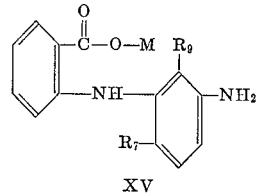

XV where M and $R_7$ are as defined earlier; $R_9$ is methyl or chlorine; and $R_{10}$ and $R_{11}$ are the same and are each methyl or ethyl, or are combined with the nitrogen atom to which they are attached to represent a heterocyclic ring, such as pyrrolidino. This alkylation process can be carried out in different ways. In general, the alkylation can be accomplished by reacting the N-(3-aminophenyl)anthranilic acid compound of formula XV with an alkylating agent in the presence of a base. Preferred alkylating agents are lower alkyl halides, such as methyl iodide, ethyl bromide, ethyl iodide, and 1,4-dichlorobutane; other alkylating agents, such as lower alkyl esters of inorganic acids and lower alkyl esters of organic sulfonic acids may also be used. The reaction is readily carried out in the presence of a base; suitable bases for this purpose are alkali metal hydroxides, such as sodium hydroxide and potassium hydroxide, and alkali metal carbonates, such as potassium carbonate. Equivalent quantities of reactants may be used, but it is preferable to employ the base and alkylating agent in excess of the amount required for dialkylation. The reaction is advantageously carried out in a solvent medium. The choice of solvent depends somewhat on the nature of the N-(3-aminophenyl)anthranilic acid compound of Formula XV employed. When M in formula XV is hydrogen or an alkali metal cation, the preferred solvent is a mixture of a lower alkanol, such as methanol, ethanol, and isopropanol, or a lower aliphatic ketone, such as acetone, methyl ethyl ketone, and diethyl ketone, with water. When M in Formula XV is lower alkyl, the preferred solvent is an anhydrous lower alkanol or lower aliphatic ketone. The time and temperature of the reaction are not critical and may be varied over a wide range, depending on the nature of the solvent and the alkylating agent employed. When the N-(3-aminophenyl)anthranilic acid compound of Formula XV used as starting material is a lower alkyl ester, the product of this alkylation reaction is the corresponding ester of Formula XIV. The corresponding free acid may be obtained from the ester by hydrolysis in an acidic medium. When the starting material is the free acid or salt, the product may be isolated as the corresponding salt or as the free acid by acidification of the reaction product mixture.

For the preparation of the N-(3-dimethylaminophenyl) anthranilic acid compounds of Formula XIV, the alkylation reaction can also be accomplished by reacting an N-(3-aminophenyl)anthranilic acid compound of Formula XV with formaldehyde and hydrogen in the presence of a hydrogenation catalyst. This reductive alkylation process is carried out in a solvent, which is preferably a lower alkanol, such as methanol, ethanol, and isopropanol, water, or mixtures of these. Suitable hydrogenation catalysts are the noble metal catalysts, such as platinum oxide, palladium oxide, platinum, and palladium, used as finely divided powders either in the free state or supported on an inert carrier such as charcoal. At least two molar equivalents, and preferably an excess, of formaldehyde is employed. Preferred conditions for this reductive alkylation are room temperature and a hydrogen pressure of one atmosphere; more vigorous conditions should not be employed when either of $R_7$ or $R_9$ in Formula XV is chlorine in order to avoid reductive removal of this halogen.

The N-(3-aminophenyl)anthranilic acid compounds of Formula XV employed as starting materials in the foregoing reductive alkylation process are advantageously prepared in situ by first reducing an N-(3-nitrophenyl)-anthranilic acid compound of the formula

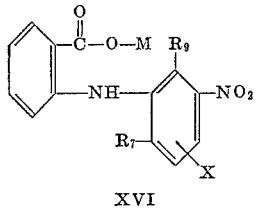

XVI and then reacting the intermediate product, without isolation, with hydrogen to remove the bromine or iodine atom; where M, $R_7$, $R_9$, and X have the aforementioned significance. The N-(3-aminophenyl)anthranilic acid compounds prepared in this manner are then reacted further without isolation.

Further in accordance with the invention, N-(aminophenyl)anthranilic acid compounds of the formula

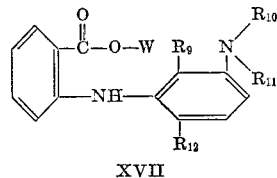

XVII are produced by hydrolysis of an N-acylated diphenylamine compound of the formula

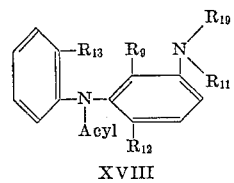

XVIII where $R_9$, $R_{10}$, and $R_{11}$ have the aforementioned significance; W represents hydrogen or an alkali metal cation, preferably potassium; acyl represents an acyl radical; $R_{12}$ is methyl or chlorine; and $R_{13}$ is a carboxy group (either in free acid or salt form) or a group hydrolyzable to a carboxy group, such as a cyano, carboalkoxy, carboaryloxy, carboarylalkoxy, carbamoyl, or carbonyl halide group. The precise nature of the acyl group and the group hydrolyzable to a carboxy group is not critical because during the process the acyl group is removed and the hydrolyzable group is converted to a carboxyl group. Therefore, if desired, the acyl group and, in the appropriate cases, the group hydrolyzable to a carboxy group may contain one or more substituents such as lower alkyl, lower alkoxy, halogen, nitro, carboxy and carbo- alkoxy groups and as used herein the terms "acyl" and "group hydrolyzable to a carboxy group" will be understood to include the substituted as well as the unsubstituted radicals. The hydrolysis can be carried out either in an acidic or alkaline medium. An alkaline medium is preferred. The hydrolysis in an alkaline medium can be effected by dissolving the N-acylated diphenylamine compound of Formula XVIII in a water-miscible, non-reactive organic solvent such as ethanol or methanol, adding a large excess of a concentrated aqueous solution of sodium or potassium hydroxide and allowing the hydrolysis to proceed (with or without stirring) until the reaction is complete. The hydrolysis is favored by temperatures in excess of 75° C. and is preferably effected at temperatures ranging from 75° C. to about 150° C. The hydrolysis not only removes the N-acyl group from the acylated diphenylamine compound but also converts the group hydrolyzable to a carboxy group, if present, to a carboxyl group. When alkaline reaction conditions are used, the anthranilic acid compound is present in the reaction mixture in the form of a carboxylate salt while if acidic conditions are used, it is present as the free acid.

The N-acylated diphenylamine compounds of Formula XVIII used as starting materials in the foregoing process can be prepared in a number of ways. For example, an anilide of the formula

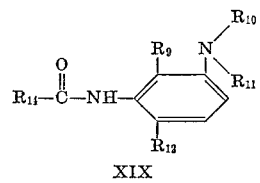

XIX can be reacted with phosphorus pentachloride to produce a benzimidolyl chloride of the formula

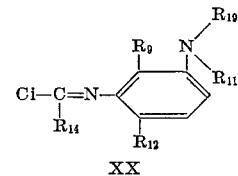

XX and the benzimidoyl chloride reacted in the presence of a base with a phenol compound of the formula

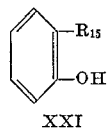

XXI or an alkali metal salt thereof and the resulting imidoester of the formula

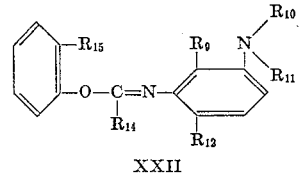

XXII subjected to intramolecular rearrangement by heating to obtain an N-acylated diphenylamine compound having the formula

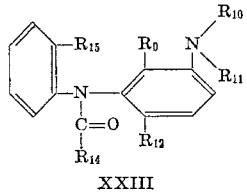

XXIII where $R_9$, $R_{10}$, $R_{11}$, and $R_{12}$ have the aforementioned significance; $R_{14}$ is a tertiary alkyl group, such as a tertiary butyl group, or an aryl radical, preferably a phenyl radical that may optionally contain one or more substituents such as halogen, nitro, lower alkyl, lower alkoxy, carboxy, and carboalkoxy; and $R_{15}$ is a cyano, carboalkoxy, carboaryloxy, carboarylalkoxy, or carbamoyl group.

Some of the N-acylated diphenylamine compounds can also be prepared according to the following procedure. A phenol compound of the formula

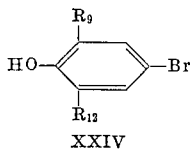

XXIV is methylated in the presence of base to produce the corresponding anisole compound; the anisole compound is nitrated to produce a 3-nitroanisole compound of the formula

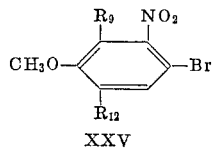

XXV and the 3-nitroanisole compound is first reduced under conditions whereby the bromine atom is removed and then alkylated to produce a 3-aminoanisole compound of the formula

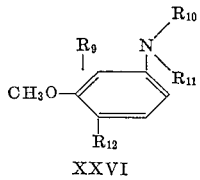

XXVI

The 3-aminoanisole compound is reacted with hydrobromic acid to produce the corresponding 3-aminophenol compound, the 3-aminophenol compound is reacted with a benzimino chloride compound of the formula

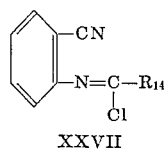

XXVII and the resulting imidoester of the formula

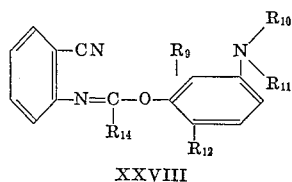

XXVIII is subjected to intramolecular rearrangement by heating to obtain an N-acylated diphenylamine compound of the formula

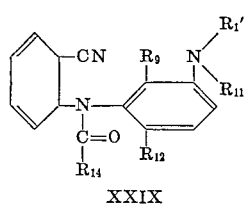

XXIX where $R_9$, $R_{10}$, $R_{11}$, $R_{12}$, and $R_{14}$ are as defined previously.

The lower alkyl N-(aminophenyl) anthranilate compounds of the invention having the formula

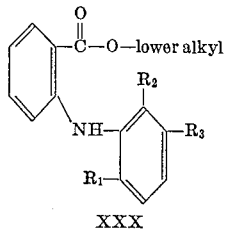

XXX are produced by reacting an N-(aminophenyl)anthranilic acid compound of the formula

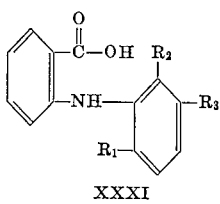

XXXI or a reactive derivative thereof with an esterifying agent; where $R_1$, $R_2$, and $R_3$ are as defined previously.

Some examples of suitable reactive derivatives are the acid anhydride, acid halides, and alkali metal salts of the acid. Some examples of suitable esterifying agents are lower alkanols, such as methanol and ethanol, esters of lower alkanols, such as methyl bromide, methyl iodide, ethyl iodide, and dimethyl sulfate, and diazomethane.

When any of $R_1$, $R_2$, or $R_3$ in Formula XXXI is primary amino, the only satisfactory method of esterification is the reaction of the free acid of Formula XXXI with a lower alkanol in the presence of a catalytic amount of an acid catalyst, such as hydrogen chloride, sulfuric acid, or benzenesulfonic acid. An excess of the lower alkanol is normally employed. Additional solvents such as tetrahydrofuran, dioxane, or diethylene glycol dimethyl ether may be present but are not necessary. The reaction is commonly carried out at a temperature in excess of 25° C., preferably at 60–150° C., but not higher than the reflux temperature, and is normally completed within 5 to 100 hours.

When $R_3$ in Formula XXXI is a tertiary amino group as defined earlier, the esterification process can be carried out in a number of ways. The free acid can be reacted with an excess of a lower alkanol as described above; the acid anhydride or acid halide can also be reacted with an excess of a lower alkanol under similar conditions; or the free acid of Formula XXXI or a salt thereof can be reacted with an ester of a lower alkanol in a solvent. When the free acid is used, the reaction is preferably carried out in the presence of a base, such as an alkali metal hydroxide, an alkali metal carbonate, an alkaline earth metal hydroxide, an alkali metal alkoxide, and, in a non-hydroxylic solvent, an alkali metal hydride. Some examples of suitable solvents are lower alkanols, tetrahydrofuran, dioxane, N,N-dimethylformamide, diethylene glycol dimethyl ether, and mixtures of these. At least one equivalent and preferably an excess of the esterifying agent is used. The reaction is usually carried out at a temperature between 25 and 150° C., preferably between 50 and 100° C. Under these conditions, the reaction is substantially complete within 24 hours.

When $R_3$ in Formula XXXI is tertiary amino, the esterifying agent may also be diazomethane, in which case the process is preferably carried out in an unreactive solvent, such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under wihch conditions the esterification is complete within less than 5 minutes.

The reactive derivatives of the N-(aminophenyl)-anthranilic acids of Formula XXXI, where R₃ is a tertiary amino group, which are used as starting materials in the foregoing process, are prepared in a number of ways. The acid halides are prepared by reacting the free N-(aminophenyl)antharnilic acids of Formula XXXI with a halogenating agent, such as thionyl chloride. The alkali metal salts are prepared by reacting the free acids with an alkali metal hydroxide. The acid anhyydrides are prepared by reacting an alkali metal salt of the free acid with the acid chloride.

Di-lower alkyl-aminoalkyl N-(aminophenyl)-anthranilate compounds of the invention having the formula

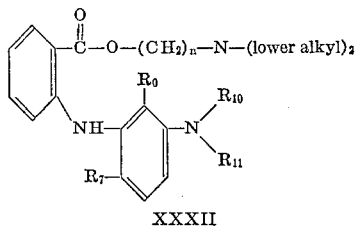

XXXII and acid-addition salts thereof are produced by esterifying an N-(aminophenyl)-anthranilic acid having the formula

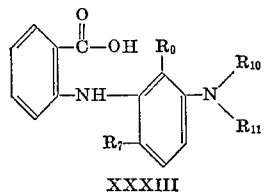

XXXIII or a reactive derivative thereof with an aminoalcohol of the formula

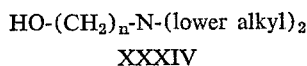

XXXIV or a reactive derivative thereof; where $n$ is 2, 3, or 4 and $R_7$, $R_9$, $R_{10}$, and $R_{11}$ are as defined before. This esterification can be carried out in a number of ways. One of the preferred methods involves reacting the N-aminophenyl)anthranilic acid of Formula XXXIII with a di-lower alkyl-aminoalkyl halide of the formula

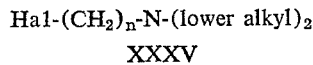

XXXV where Hal is a halogen atom, preferably chlorine or bromine, and $n$ is as defined above. The di-lower alkyl-aminoalkyl halide is preferably utilized in the form of the corresponding hydrohalide salt. For reasons of economy the reaction is usually carried out in the presence of one or more equivalents of a substance having a greater base strength than the di-lower alkyl-aminoalkyl halide. Some examples of suitable basic compounds are tertiary amines such a triethylamine, and N-ethylpiperidine and inorganic bases such as the alkali metal carbonates, alkali metal bicarbonates, alkaline earth metal carbonates, alkaline earth metal oxides and the like. The reaction is carried out under substantially anhydrous conditions and in an inert organic solvent such as N,N-dimethylformamide, benzene, xylene, toluene and the like. The relative quantities of the reactants are not particularly critical. Usually, the N-(aminophenyl)anthranilic acid and the di-lower alkyl-aminoalkyl halide are used in approximately equivalent quantities. When the free N-(aminophenyl)anthranilic acid and the free base of the di-lower alkyl-aminoalkyl halide are so used, approximately one equivalent of a basic compound is employed and the desired di-lower alkyl-aminoalkyl ester is obtained in the reaction mixture as the free base. Alternatively, when a hydrohalide salt of the di-lower alkyl-aminoalkyl halide is employed, approximately two equivalents of the basic compound are preferably used and the di-lower alkyl-aminoalkyl ester is again obtained as the free base. The temperature of the reaction is not critical and may be varied from about 50 to 125° C. The preferred reaction temperature is in the neighborhood of 100° C., that is, between about 85 and 110° C.

The esterification can also be carried out by reacting an acid halide, preferably an acid chloride, of the N-(aminophenyl)anthranilic acid of Formula XXXIII with an amino alcohol of Formula XXXIV. The reaction can be carried out by dissolving the reactants in an inert organic solvent and allowing the reaction mixture to stand at ordinary temperature, that is, 20 to 25° C. Some of the organic solvents that can be used for the reaction are aromatic hydrocarbons, such as benzene, xylene, and toluene; aliphatic hydrocarbons, such as pentane and petroleum ether; and ethers, such as diethyl ether, dibutyl ether, and dioxane. The relative quantities of the two reactants are not critical but it is preferable to use approximately two equivalents of the aminoalcohol for each equivalent of the N-(aminophenyl)anthranilic acid chloride.

The di-lower alkyl-aminoalkyl N-(aminophenyl)-anthranilate compounds of the invention form acid-addition salts with a variety of inorganic and organic acids. Some examples of pharmaceutically-acceptable acid-addition salts that can be prepared either as described above or by reaction with the corresponding acid are the hydrochloride, hydrobromide, sulfate, phosphate, hydriodide, acetate, propionate, citrate, tartrate, benzoate, sulfamate, and benzenesulfonate. The di-lower alkyl-aminoalkyl N-(aminophenyl)anthranilates also form pharmaceutically-acceptable quaternary ammonium salts by reaction of the free bases with an alkyl halide, such as methyl bromide, methyl iodide, and ethyl iodide.

The free N-(aminophenyl)anthranilic acids of Formula I form pharmaceutically-acceptable salts with a variety of inorganic and organic bases. Some typical examples of these salts are the sodium, potassium, calcium, ammonium, choline, 2-hydroxyethylammonium, bis(2-hydroxyethyl)ammonium, tris(2-hydroxyethyl)ammonium, and like salts. Preferred salts are the pharmaceutically-acceptable salts of an alkali metal, an alkaline earth metal, ammonia or a substituted ammonia.

The N-(aminophenyl)anthranilic acids of Formula I, their pharmaceutically-acceptable salts, the lower alkyl esters thereof, the di-lower alkyl-aminoalkyl esters thereof, and the pharmaceutically-acceptable acid-addition salts and quaternary ammonium salts of the di-lower alkyl-aminoalkyl esters thereof possess a high degree of anti-inflammatory activity, and hence are of value in mitigating the symptoms associated with inflammatory conditions as well as in preventing or suppressing the occurrence of inflammation. The preferred compounds for use as anti-inflammatory agents are the free N-(aminophenyl)anthranilic acids of Formula I and their pharmaceutically-acceptable salts. The compounds of the invention also exhibit anti-pyretic activity, as well as anti-allergic activity. Their anti-allergic activity is demonstrated by their antagonism toward bradykinin. This effect is observed as a suppression of the bronchoconstriction produced by bradykinin in laboratory animals, especially in guinea pigs. The compounds of the invention are preferably administered by the oral route.

The preferred compounds of the invention, because of their high anti-inflammatory activity, are the N-(aminophenyl)anthranilic acids having the formula

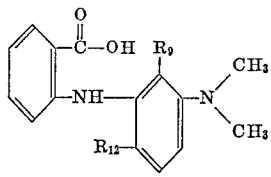

and pharmaceutically-acceptable salts thereof; where $R_9$ and $R_{12}$ are as defined previously.

The invention is illustrated by the following examples:

Example 1

A mixture consisting of 3.53 g. of N-6-chloro-2-methyl-3-nitrophenyl)anthranilic acid, 0.3 g. of 10% palladium on charcoal, and 80 ml. of ethanol is shaken at room temperature with hydrogen at one atmosphere pressure until 3 molar equivalents of hydrogen are taken up. The catalyst is removed by filtration, the filtrate is diluted with an equal volume of water, and the N-(3-amino-6-chloro-2-methylphenyl)anthranilic acid that precipitates is isolated, washed with water, and dried; M.P. 240° C.

In a similar manner, the following N-(3-aminophenyl)anthranilic acid compounds are prepared by the catalytic hydrogenation of the specified N-(3-nitrophenyl)anthranilic acid compounds:

(a) By catalytic hydrogenation of methyl N-(6-chloro-2-methyl-3-nitrophenyl)anthranilate there is obtained methyl N-(3-amino-6-chloro-2-methylphenyl)anthranilate.

(b) By catalytic hydrogenation of N-(2,6-dimethyl-3-nitrophenyl)anthranilic acid there is obtained N-(3-amino - 2,6 - dimethylphenyl)anthranilic acid, M.P. 232–234° C.

The N - (6 - chloro-2-methyl-3-nitrophenyl)anthranilic acid, M.P. 237° C., used as starting material in the foregoing procedure is obtained by nitration of 6-chloro-2-methylaniline, followed by condensation of the 6-chloro-3-nitro-2-methylaniline obtained, M.P. 84–85° C., with potassium o-bromobenzoate in a manner analogous to that described in Example 3 for the preparation of N-(4-bromo - 2,6-dichloro-3-nitrophenyl)anthranilic acid. The methyl ester of N-(6-chloro-2-methyl-3-nitrophenyl)anthranilate is obtained by esterifying the free acid with methyl iodide in the presence of potassium carbonate in methanol solution.

Example 2

A mixture of 1.2 g. of N-(3-chloro-2-methyl-6-nitrophenyl)anthranilic acid, 0.5 g. of Raney nickel and 300 ml. of ethanol is shaken with hydrogen at one atmosphere pressure until 3 molecular equivalents are taken up. The catalyst is removed by filtration, and the filtrate is evaporated under reduced pressure. The solid N-(6-amino-3-chloro-2-methylphenyl)anthranilic acid obtained is crystallized from aqueous ethanol; M.P. 244.5–245° C.

In a similar manner, by catalytic hydrogenation of N-(2,3-dichloro-6-nitrophenyl)anthranilic acid there is obtained N-(6-amino-2,3-dichlorophenyl)anthranilic acid.

Example 3

A mixture consisting of 2.63 g. of N-(4-bromo-2,6-dichloro-3-nitrophenyl)anthranilic acid, 0.2 g. of platinum oxide and 500 ml. of 96% ethanol is shaken at room temperature with hydrogen at one atmosphere pressure until 0.0195 mole is taken. To the mixture, which contains N-(4-bromo-2,6-dichloro-3-aminophenyl)anthranilic acid, are added 0.55 g. of powdered sodium acetate and 0.2 g. of 5% palladium on charcoal, and the resulting mixture is again shaken with hydrogen at room temperature and one atmosphere pressure until 0.0065 mole is taken up. The mixture is filtered, the filtrate is evaporated to dryness under reduced pressure, and the solid N-(3-amino-2,6-dichlorophenyl)anthranilic acid obtained is crystallized from ethyl acetate-petroleum ether; M.P. 234–235° C.

The potassium salt of N-(3-amino-2,6-dichlorophenyl) anthranilic acid is obtained by treating a solution of 1.0 g. of the free acid in warm ethanol with an equivalent amount of potassium hydroxide dissolved in ethanol, and evaporating the resulting mixture to dryness under reduced pressure.

N-(3-amino - 2,6 - dichlorophenyl)anthranilic acid (5.0 g.) is suspended in 30 ml. of acetone and one equivalent of diethanolamine in 20 ml. of acetone is added with stirring. The clear solution is diluted with 30 ml. of petroleum ether, and the solution is allowed to stand at room temperature. The diethanolamine salt of N-(3-amino-2,6-dichlorophenyl)anthranilic acid obtained is collected and dried.

The N-(4-bromo-2,6-dichloro-3-nitrophenyl)anthranilic acid used as starting material in the foregoing procedure is prepared as follows. A solution of 66.7 g. of 4-bromo-2,6-dichloroaniline and 3 drops of concentrated sulfuric acid in a mixture of 450 ml. of acetic acid and 30.6 g. of acetic anhydride is heated at 90–100° C. for 75 minutes. Upon dilution with hot water there is obtained 4-bromo-2,6-dichloroacetanilide, M.P. 208–209° C. This product (5.66 g.) is dissolved in 35 ml. of concentrated sulfuric acid, and the stirred solution is treated with a mixture of 0.86 ml. of nitric acid and 5 ml. of concentrated sulfuric acid over a period of 30 minutes at room temperature. The mixture is stirred for one hour more at room temperature, is poured into 200 ml. of ice water, and the solid 4-bromo - 2,6 - dichloro-3-nitroacetanilide obtained is isolated, washed with water and dried; M.P. 198–199° C., after several crystallizations from aqueous ethanol. A solution of 14.35 g. of 4-bromo-2,6-dichloro-3-nitroacetanilide in 72 g. of concentrated sulfuric acid is heated at 90° C. for 3 hours, and is then poured into 200 ml. of water. The solid 4-bromo-2,6-dichloro-3-nitroaniline obtained is isolated, washed with water, and crystallized from aqueous ethanol; M.P. 92–93° C.

A mixture consisting of 30.3 g. of 4-bromo-2,6-dichloro-3-nitroaniline, 25.4 g. of potassium o-bromobenzoate, 12.2 g. of N-ethylmorpholine, 1.5 g. of cupric bromide and 200 ml. of diethylene glycol dimethyl ether is stirred and heated under nitrogen at 170–190° C. for 5.5 hours. After cooling, the mixture is stirred with 1000 ml. of 0.5 N sodium hydroxide and filtered. The filtrate is heated with charcoal, filtered again, and acidified with concentrated hydrochloric acid. The N-(4-bromo-2,6-dichloro-3-nitrophenyl)anthranilic acid that precipitates is isolated, washed with water, and crystallized twice from aqueous ethanol; M.P. 270–272° C.

Example 4

A mixture consisting of 0.69 g. of 2,6-dichloro-3-dimethylaminoaniline, 0.805 g. of potassium o-bromobenzoate, 0.39 g. of N-ethylmorpholine, 0.1 g. of cupric bromide, and 10 ml. of diethylene glycol dimethyl ether is stirred and heated under nitrogen at 170–180° C. for 4 hours. After cooling, the mixture is made alkaline with 2 N aqueous sodium hydroxide, warmed with charcoal, filtered, and the filtrate is acidified to pH 4 with hydrochloric acid. The N-(2,6-dichloro-3-dimethylaminophenyl)anthranilic acid that precipitates is isolated, washed with water, and crystallized from aqueous ethanol; M.P. 195–197° C.

In a similar manner, from the condensation of potassium o-bromobenzoate with 3,6-dichloro - o - phenylenediamine there is obtained N - (2 - amino - 3,6 - dichlorophenyl)anthranilic acid, M.P. 231° C.

The ammonium salt of N-(2,6 - dichloro - 3 - dimethylaminophenyl)anthranilic acid is prepared by dissolving the free acid in hot ethanol, treating the solution with an excess of ammoniacal ethanol, and evaporating the mixture to dryness under reduced pressure.

The 2,6-dichloro-3-dimethylaminoaniline used as starting material in the foregoing procedure is prepared as follows. 2,6-dichloro - 3 - nitroaniline is acetylated with acetic anhydride to give 2,6-dichloro-3-nitroacetanilide, M.P. 186–187° C., and this product is catalytically hydrogenated to give 3-amino - 2,6 - dichloroacetanilide, M.P. 219–221° C. A mixture of 4.7 g. of 3-amino-2,6-dichloroacetanilide, 30 ml. of 40% aqueous formaldehyde, 1.0 g. of 10% palladium on charcoal, and 150 ml. of 96% ethanol is shaken with hydrogen at one atmosphere pressure until 0.043 mole is taken up. The catalyst is removed by filtration, and the filtrate is evaporated to dryness under reduced pressure to give 2,6-dichloro-3-dimethylaminoacetanilide; M.P. 170.5–172° C. after two crystallizations from aqueous ethanol. This product is hydrolyzed with hydrochloric acid to give the desired 2,6-dichloro-3-dimethylaminoaniline, obtained as an oil that was not further purified.

Example 5

A mixture of 4.15 g. of N-(4-bromo-2,6-dichloro-3-nitrophenyl)anthranilic acid, 0.7 g. of 10% platinum on charcoal, and 280 ml. of 96% ethanol is shaken at room temperature with hydrogen at one atmosphere pressure until 0.0306 mole is taken up. To the mixture is added 0.845 g. of anhydrous sodium acetate, and hydrogenation at room temperature and one atmosphere pressure is resumed until 0.0102 mole more of hydrogen is taken up. The mixture is filtered, and to the filtrate, which now contains N-(3-amino - 2,6 - dichlorophenyl)anthranilic acid, is added 21 ml. of 40% aqueous formaldehyde and 1.0 g. of 10% palladium on charcoal. This mixture is then shaken at room temperature with hydrogen at one atmosphere pressure until 0.024 mole is taken up, the catalyst is removed by filtration, and the filtrate is concentrated under reduced pressure to a volume of about 50 ml. Dilution with water precipitates N-(2,6-dichloro-3-dimethylaminophenyl)anthranilic acid, which is isolated, washed with water, and crystallized twice from aqueous ethanol.

The sodium salt of N-(2,6-dichloro-3-dimethylaminophenyl)anthranilic acid is prepared by treating a solution of 1.0 g. of the free acid in hot ethanol with an equivalent amount of sodium hydroxide dissolved in ethanol, and evaporating the resulting mixture to dryness under reduced pressure.

A mixture of 1.42 g. of choline chloride and 3.5 g. of the sodium salt of N - (2,6 - dichloro-3-dimethylaminophenyl)anthranilic acid in ethanol is heated to about 70° C. for 10–15 minutes. The sodium chloride that forms in the course of the reaction is removed by filtration and the filtrate is concentrated under reduced pressure to give the N-(2,6-dichloro - 3 - dimethylaminophenyl)anthranilic acid choline salt.

Example 6

A mixture of 0.61 g. of N-(3-amino-2,6-dichlorophenyl)anthranilic acid, 0.2 g. of 10% palladium on charcoal, 4 ml. of 40% aqueous formaldehyde, and 35 ml. of ethanol is shaken with hydrogen at one atmosphere pressure for 4.5 hours or until two molecular equivalents of hydrogen are taken up. The catalyst is removed by filtration, and the filtrate is evaporated under reduced pressure to obtain N-(2,6-dichloro - 3 - dimethylaminophenyl)anthranilic acid.

By utilizing the foregoing procedure, the following N-(3-dimethylaminophenyl)anthranilic acid compounds are prepared from the specified N-(3-aminophenyl)anthranilic acid compounds:

(a) From N-(3-amino - 6 - chloro-2-methylphenyl)anthranilic acid there is obtained N-(6-chloro-3-dimethylamino-2-methylphenyl)anthranilic acid; M.P. 201–202° C., after crystallization from aqueous ethanol.

(b) From N-(3-amino-2,6-dimethylphenyl)anthranilic acid there is obtained N-(2,6-dimethyl-3-dimethylaminophenyl)anthranilic acid; M.P. 162–163° C., after crystallization from aqueous methanol.

(c) From N-(3-amino - 2 - methylphenyl)anthranilic acid there is obtained N-(3-dimethylamino-2-methylphenyl)anthranilic acid; M.P. 180–182° C., after crystallization from aqueous ethanol.

Example 7

A mixture consisting of 3.05 g. of N - (3 - amino-6-chloro-2-methylphenyl)anthranilic acid, 6.0 ml. of 10 N aqueous sodium hydroxide, 10 g. of ethyl iodide, and 10 ml. of ethanol is heated under reflux for 30 hours. Water (ca. 20 ml.) is added and the ethanol and excess ethyl iodide are removed by evaporation under reduced pressure. The resulting solution is acidified to pH 6 with hydrochloric acid, and the N-(6-chloro-3-diethylamino-2-methylphenyl)anthranilic acid that precipitates is collected and crystallized, first from aqueous ethanol, then from butyl acetate; M.P. 171–172° C.

Example 8

A mixture consisting of 1.8 g. of methyl N-(3-amino-6-chloro-2-methylphenyl)anthranilate, 2.5 g. of 1,4-dichlorobutane, 3.2 g. of potassium carbonate, and 5.0 ml. of ethanol is stirred and heated at 75° C. for 43 hours. After filtration of the mixture, the filtrate is evaporated to dryness under reduced pressure, and the solid methyl N-(6-chloro-2-methyl - 3 - pyrrolidinyl)anthranilate obtained is crystallized from aqueous ethanol.

Example 9

A solution of 1.0 g. of N-benzoyl-2-cyano-2',6'-dichloro-3'-dimethylaminodiphenylamine in a mixture of 12.5 ml. of ethanol and 3.4 ml. of water containing 1.7 g. of sodium hydroxide is heated at the reflux temperature under nitrogen for 4 hours. The solution is diluted with 75 ml. of water and acidified to pH 4 with hydrochloric acid. The solid N-(2,6-dichloro-3-dimethylaminophenyl)anthranilic acid obtained is isolated, washed with water and crystallized from 50% aqueous ethanol.

In a similar manner, from the basic hydrolysis of N-benzoyl-2-cyano-2'-chloro-3'-dimethylamino - 6' - methyldiphenylamine, there is obtained N-(2-chloro-3-dimethylamino - 6 - methylphenyl)anthranilic acid, M.P. 163–165° C., after successive crystallizations, first from ethanol, then from benzene.

The N-benzoyl-2-cyano - 2',6' - dichloro-3'-dimethylaminodiphenylamine used as a starting material in the foregoing procedure is prepared according to the following procedure.

4-bromo-2,6-dichlorophenol is reacted with dimethyl sulfate in the presence of base to prepare 4-bromo-2,6-dichloroanisole; M.P. 67–68° C., after crystallization from benzene. This product is nitrated by reaction with fuming nitric acid to obtain 4-bromo-2,6-dichloro-3-nitroanisole; M.P. 62–64° C., after crystallization from petroleum ether (B.P. 60–80° C.). A mixture consisting of 7.86 g. of 4-bromo-2,6-dichloro-3-nitroanisole, 2.46 g. of sodium acetate, 0.5 g. of 10% platinum on charcoal, 0.75 g. of 10% palladium on charcoal, and 150 ml. of ethanol is shaken with hydrogen at one atmosphere pressure until 0.104 mole of hydrogen is taken up. Aqueous formaldehyde (37.4%; 30 ml.) is added to the mixture and hydrogenation is resumed until 0.055 mole more of hydrogen is taken up. The catalyst is removed by filtration, and the filtrate is evaporated to dryness. The oily residue is stirred with aqueous sodium bicarbonate solution, and the alkaline mixture is extracted with several portions of ether. The ether extracts are combined, washed successively with aqueous sodium bicarbonate solution and with a saturated aqueous solution of sodium chloride, and dried. The dried ether solution is evaporated to dryness under reduced pressure and the oily residue is distilled at reduced pressure to obtain 2,6-dichloro-3-dimethylaminoanisole; B.P. 87–92° C./0.4 mm. Hg; $n_D^{19}$, 1.5631.

A solution of 73 g. of 2,6-dichloro-3-dimethylaminoanisole in 225 ml. of 48% hydrobromic acid is heated under reflux for 4 hours and then evaporated to dryness under reduced pressure. The residue is dissolved in 600 ml. of warm water, and the aqueous solution is made alkaline with sodium bicarbonate. The organic phase is separated, and extracted with ether. The ether extract is washed with saturated aqueous sodium chloride, dried, and evaporated to dryness under reduced pressure. The oily residue is distilled at reduced pressure to obtain 2,6-dichloro-3-dimethylaminophenol; B.P. 105° C./0.6 mm. Hg; M.P. 58–60° C.

A solution of 40.13 g. of 2,6-dichloro-3-dimethylaminophenyl in 44.6 ml. of diethylene glycol dimethyl ether is added to a stirred suspension of 10.28 g. of 50% sodium hydride (mineral oil dispersion) in 74.3 ml. of diethylene glycol dimethyl ether kept at 0° C. When hydrogen evolution ceases, a solution of 48.3 g. N-(o-cyanophenyl) benzimino chloride in 148.6 ml. of diethylene glycol dimethyl ether is added, and the resulting solution is stirred and heated at 100° C. for 5 hours. About 235 ml. of solvent is removed by distillation at 100° C. under reduced pressure (30 mm. Hg), and the residue is dissolved in a mixture consisting of 200 ml. of ether, 100 ml. of petroleum ether (B.P. 40–60° C.), and 250 ml. of a eutectic mixture of diphenyl ether (73.5%) and biphenyl (26.5%) (Dowtherm A). The solution is washed with water, then with saturated aqueous sodium bicarbonate, and dried. The dried solution is distilled to remove solvents boiling below 252° C., and the resulting solution is heated under reflux for 90 minutes. The rest of the solvent mixture is removed by distillation at 100° C./3 mm. Hg, and the solid residue of N-benzoyl-2-cyano-2',6'-dichloro-3'-dimethylaminodiphenylamine is crystallized twice from 96% ethanol; M.P. 155–157° C.

The N - benzoyl - 2 - cyano - 2' - chloro - 3' - dimethylamino-6'-methyldiphenylamine, also used as a starting material in the procedure of this example, is prepared in an analogous manner by reacting 2-chloro-6-methyl-3-nitrophenol with methyl iodide in the presence of base to produce 2-chloro-6-methyl-3-nitroanisole, M.P. 39–41° C.; reductively methylating this product by reaction with formaldehyde and zinc amalgam in acid to prepare 2-chloro-3-dimethylamino-6-methylanisole, B.P. 80–84° C./0.7 mm. Hg; $n_D^{20}$, 1.5427; reacting this anisole compound with 48% hydrobromic acid to obtain 2-chloro-3-dimethylamino-6-methylphenol, M.P. 84–86° C./0.9 mm. Hg, $n_D^{22}$, 1.5642; and, finally, reacting the phenol compound with N-(o-cyanophenyl)benzimino chloride under conditions whereby thermal rearrangement occurs to produce the desired N-benzoyl-2-cyano-2'-chloro-3'-dimethylamino-6'-methyldiphenylamine.

Example 10

A mixture consisting of 10.0 g. of N-(6-chloro-3-dimethylamino-2-methylphenyl)anthranilic acid, 100 ml. of absolute ethanol, and 5 ml. of sulfuric acid is heated under reflux for 24 hours. After cooling, the solution is diluted with 500 ml. of water, made basic with aqueous sodium carbonate and extracted with ether. The ether extract is washed with water, dried, and evaporated to dryness to yield ethyl N-(6-chloro-3-dimethylamino-2-methylphenyl) anthranilate.

Utilizing the foregoing procedure, the following lower alkyl N-(aminophenyl)anthranilate compounds are prepared by reaction of the specified N-(aminophenyl)anthranilic acid and lower alkanol:

(a) From reaction of N-(2,6-dichloro-3-dimethylaminophenyl)anthranilic acid with absolute ethanol there is obtained ethyl N-(2,6-dichloro-3-dimethylaminophenyl)anthranilate.

(b) From reaction of N-(2,6-dimethyl-3-dimethylaminophenyl)anthranilic acid with absolute methanol there is obtained methyl N-(2,6-dimethyl-3-dimethylaminophenyl)anthranilate.

(c) From reaction of N-(2-amino-3,6-dichlorophenyl) anthranilic acid with absolute ethanol there is obtained ethyl N - (2 - amino - 3,6 - dichlorophenyl)-anthranilate.

Example 11

A mixture consisting of 3.05 g. of N-(6-chloro-3-dimethylamino-2-methylphenyl)anthranilic acid, 3.0 g. of 2-dimethylaminoethyl chloride hydrochloride, 3.0 ml. of ethanol, 12 ml. of ethyl acetate, 10 ml. of N,N-dimethylformamide and 3.0 ml. of triethylamine is heated under reflux for 30 hours. After cooling, the solid triethylamine hydrochloride is removed by filtration and washed with ether. The ether washings are added to the filtrate, and the mixture is extracted with three 20-ml. portions of 1 N hydrochloric acid. The acidic extract is made alkaline with aqueous sodium hydroxide to pH 10, and the alkaline solution is extracted with ether. The ether extract is washed with water, dried, and evaporated to dryness under reduced pressure to yield 2-dimethylaminoethyl N-(6-chloro-3-dimethylamino-2-methylphenyl)anthranilate.

In a similar manner, from the reaction of 3.25 g. of N-(2,6-dichloro-3-dimethylaminophenyl)anthranilic acid with 4.0 g. of 3-diethylaminopropyl chloride hydrochloride there is obtained 3-diethylaminopropyl N-(2,6-dichloro-3-dimethylaminophenyl)anthranilate.

The hydrochloride salt of 2-dimethylaminoethyl N-(6-chloro-3-dimethylamino-2 - methylphenyl)anthranilate is obtained by dissolving 2.0 g. of the ester in ether, treating the ethereal solution with a slight excess of anhydrous hydrogen chloride, concentrating the resulting mixture, and isolating the precipitated solid.

A suspension of 4.8 g. of 2-dimethylaminoethyl N-(6-chloro-3-dimethylamino-2-methylphenyl)anthranilate hydrochloride is 250 ml. of acetone is heated almost to boiling and then treated with 2 g. of 50% aqueous sodium hydroxide solution. The mixture is filtered and to the filtrate is added a solution of 2.5 g. of methyl iodide in 25 ml. of acetone and the resulting mixture is allowed to stand at room temperature for 3 days. To the mixture is added 100 ml. of petroleum ether and the 2-dimethylaminoethyl N-(6-chloro-3-dimethylamino-2-methylphenyl)-anthranilate methiodide that precipitates is isolated and crystallized from ethanol-petroleum ether.

I claim:

1. A compound chosen from the class consisting of N-(aminophenyl)anthranilic acid compounds, which in their free acid form have the formula

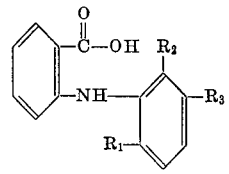

pharmaceutically-acceptable carboxylate salts thereof, lower alkyl esters thereof, di-lower alkyl-amino-lower alkyl esters thereof, and pharmaceutically-acceptable acid-addition and quaternary ammonium salts of the di-lower alkyl-amino-lower alkyl esters thereof; where $R_1$ is a member of the class consisting of hydrogen, methyl, chlorine, and primary amino; $R_2$ is a member of the class consisting of methyl, chlorine, and primary amino; and $R_3$ is a member of the class consisting of chlorine and an amino group having the formula

wherein $R_4$ and $R_5$ are members of the class consisting of hydrogen, lower alkyl, and a further member wherein $R_4$ and $R_5$ are combined with the nitrogen atom to which they are attached to represent pyrrolidino; with the added proviso that one of said $R_1$, $R_2$ and $R_3$ is an amino group.

2. N-(2-amino-3,6-dichlorophenyl)anthranilic acid.
3. N-(6-amino-2,3-dichlorophenyl)anthranilic acid.
4. N-(2,6-dichloro-3-dimethylaminophenyl)-anthranilic acid.
5. N-(2,6-dimethyl-3-dimethylaminophenyl)-anthranilic acid.
6. N-(6-chloro-3-dimethylamino-2-methylphenyl)anthranilic acid.

References Cited

UNITED STATES PATENTS

| | | | |
|---|---|---|---|
| 2,502,451 | 4/1950 | Goldberg | 260—472 |
| 2,823,235 | 2/1958 | Graham et al. | 260—518 |
| 3,107,263 | 10/1963 | Scherrer | 260—518 |
| 3,313,848 | 4/1967 | Scherrer et al. | 260—518 |

OTHER REFERENCES

Fieser et al., Advanced Organic Chemistry, 1961, p. 496 relied on.

LORRAINE A. WEINBERGER, *Primary Examiner.*

L. A. THAXTON, *Assistant Examiner.*